US012573160B2

(12) United States Patent
Ji et al.

(10) Patent No.: US 12,573,160 B2
(45) Date of Patent: Mar. 10, 2026

(54) INTIMACY-BASED MASKING OF THREE DIMENSIONAL (3D) FACE LANDMARKS

(71) Applicant: International Business Machines Corporation, Armonk, NY (US)

(72) Inventors: Xiao Feng Ji, Shanghai (CN); Yu Hong Li, Shanghai (CN); Jian Jun Wang, Xi'an (CN); Yuan Jin, Shanghai (CN); Li Ping Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 18/057,314

(22) Filed: Nov. 21, 2022

(65) Prior Publication Data

US 2024/0169682 A1 May 23, 2024

(51) Int. Cl.
*G06T 19/20* (2011.01)
*G06T 5/70* (2024.01)
*G06T 17/20* (2006.01)

(52) U.S. Cl.
CPC ............... *G06T 19/20* (2013.01); *G06T 5/70* (2024.01); *G06T 17/20* (2013.01); *G06T 2219/024* (2013.01)

(58) Field of Classification Search
CPC ........... G06T 19/20; G06T 5/70; G06T 17/20; G06T 2219/024
See application file for complete search history.

(56) References Cited

U.S. PATENT DOCUMENTS 9,799,096 B1    10/2017  Fernando et al.
10,733,699 B2    8/2020  Wang et al.
(Continued)

FOREIGN PATENT DOCUMENTS

CN      102067175 B     8/2014
WO   2009145826 A2    12/2009

OTHER PUBLICATIONS

Lei Lin et al., "AnonymousNet: Natural Face De-Identification with Measurable Privacy." Proceedings of the IEEE/SVF conference on computer vision and pattern recognition workshops (Year: 2019).*
(Continued)

*Primary Examiner* — King Y Poon
*Assistant Examiner* — David Van Nguyen
(74) *Attorney, Agent, or Firm* — Cantor Colburn LLP; Kelsey M. Skodje

(57) ABSTRACT

Aspects of the invention include techniques for intimacy-based masking of three dimensional (3D) face landmarks within a metaverse. A non-limiting example method includes determining a degree of intimacy R between a first user and a second user responsive to a first avatar of the first user being observed by a second avatar of the second user in a virtual environment. An initial set of M landmarks of a feature of the first avatar is determined and N landmarks are randomly selected from M for masking. The N landmarks are replaced with random noise sampled with a unit normal distribution to define a set of noised landmarks X that are then iteratively denoised to define a set of denoised landmarks D. A masked version of the first avatar is presented to the second user by modifying the feature of the first avatar with the set of denoised landmarks D.

20 Claims, 5 Drawing Sheets

(56) References Cited

U.S. PATENT DOCUMENTS

| | | | | |
|---|---|---|---|---|
| 2014/0119664 A1* | 5/2014 | Ioffe | .................... | G06V 40/167 |
| | | | | 382/195 |
| 2018/0158246 A1* | 6/2018 | Grau | ......................... | G06T 3/18 |
| 2019/0297304 A1* | 9/2019 | Li | ............................. | H04N 7/15 |
| 2024/0069630 A1* | 2/2024 | Model | ...................... | G06T 7/73 |

OTHER PUBLICATIONS

Tao Li et a., "AnonymousNet: Natural Face De-Identification with Measurable Privacy." Proceedings of the IEEE/SVF conference on computer vision and pattern recognition workshops, (2019): pp. 1-10.

Pablo Garrido et al., "Automatic Face Reenactment," Proceedings of the IEEE conference on computer vision and pattern recognition, (2014): 8 pages.

Lily Meng et al., "Face De-identification with perfect privacy protection," 27th International convention on Information and communication technology, electronics and microelectronics (MIPRO). IEEE (2014): 6 pages.

Yifan Wu et al., "Privacy-Protective-GAN for Face De-identification," Journal of Computer Science and Technology, arXiv preprint arXiv:1806.08906, (2019): pp. 1-11.

Datong Chen et al., "Tools for Protecting the Privacy of Specific Individuals in Video," EURASIP Journal on Advances in Signal Processing, vol. 2007, Article ID 75427, (2006): 9 pages.

* cited by examiner

202

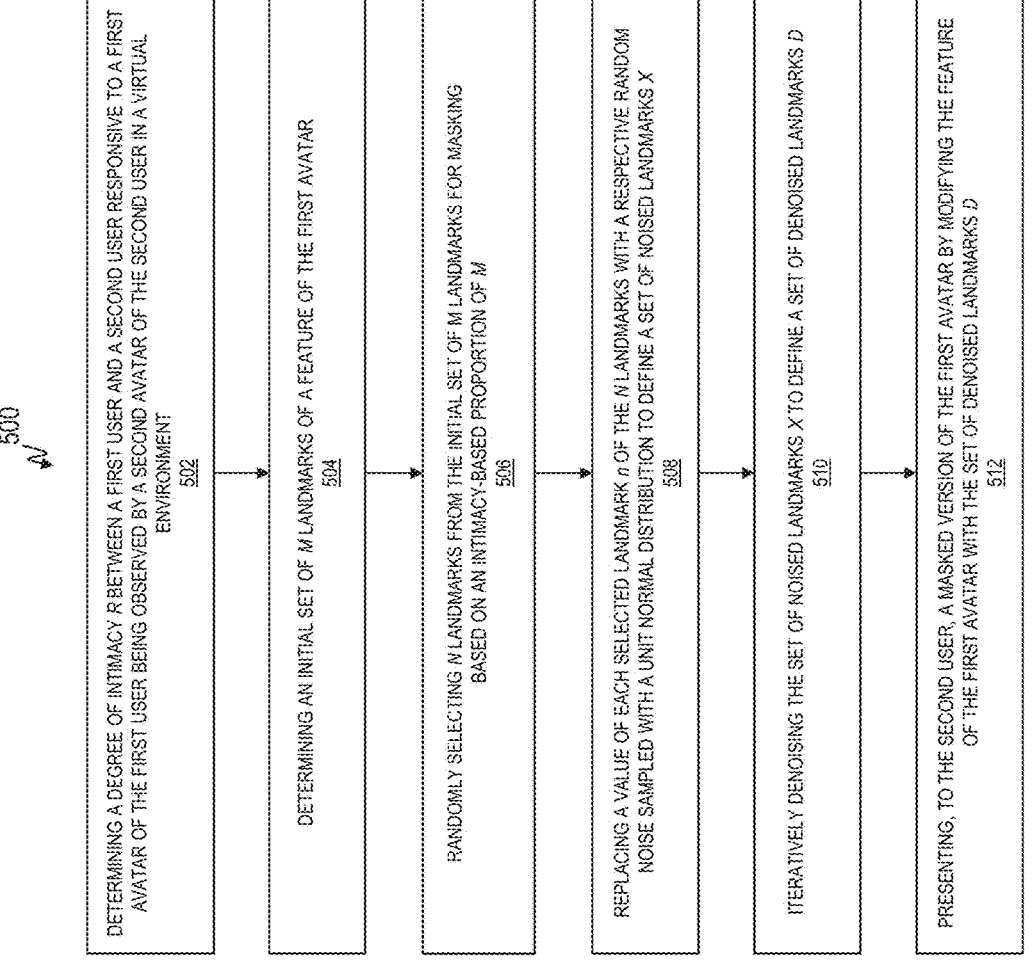

500

DETERMINING A DEGREE OF INTIMACY R BETWEEN A FIRST USER AND A SECOND USER RESPONSIVE TO A FIRST AVATAR OF THE FIRST USER BEING OBSERVED BY A SECOND AVATAR OF THE SECOND USER IN A VIRTUAL ENVIRONMENT
502

DETERMINING AN INITIAL SET OF M LANDMARKS OF A FEATURE OF THE FIRST AVATAR
504

RANDOMLY SELECTING N LANDMARKS FROM THE INITIAL SET OF M LANDMARKS FOR MASKING BASED ON AN INTIMACY-BASED PROPORTION OF M
506

REPLACING A VALUE OF EACH SELECTED LANDMARK n OF THE N LANDMARKS WITH A RESPECTIVE RANDOM NOISE SAMPLED WITH A UNIT NORMAL DISTRIBUTION TO DEFINE A SET OF NOISED LANDMARKS X
508

ITERATIVELY DENOISING THE SET OF NOISED LANDMARKS X TO DEFINE A SET OF DENOISED LANDMARKS D
510

PRESENTING, TO THE SECOND USER, A MASKED VERSION OF THE FIRST AVATAR BY MODIFYING THE FEATURE OF THE FIRST AVATAR WITH THE SET OF DENOISED LANDMARKS D
512

FIG. 5

INTIMACY-BASED MASKING OF THREE DIMENSIONAL (3D) FACE LANDMARKS

BACKGROUND

The present invention generally relates to metaverse applications, and more specifically, to computer systems, computer-implemented methods, and computer program products for providing an intimacy-based masking of three dimensional (3D) face landmarks within a metaverse.

The term metaverse is widely used to describe a fully immersive virtual space, which includes a simulated environment where humans are represented by an avatar. Each avatar is a representation of a user of the metaverse, and generally takes the form of a two-dimensional or three-dimensional human or fantastical representation of a person's self. Users can inhabit, traverse, and interact with objects and other users, both socially and economically, through their respective avatars within the metaverse. In some cases, the virtual environment in a metaverse is built upon a metaphor of the real world, but in most cases, without the physical limitations of the real world.

A metaverse can be a two-dimensional or three-dimensional virtual world formed as electronic data and can include aspects of virtual reality, augmented reality, and mixed reality technologies. Virtual reality refers to technologies that construct a virtual space that does not exist in the real world, and then make the virtual space feel real. Augmented reality and mixed reality technology are technologies that blend the virtual space with the real world, often by superimposing virtual information over a person's field of view, that is, they are technologies that combine the real world with the virtual world to enable seamless integration between those spaces.

SUMMARY

Embodiments of the present invention are directed to techniques for the intimacy-based masking of three dimensional (3D) face landmarks within a metaverse. A non-limiting example method includes determining a degree of intimacy R between a first user and a second user responsive to a first avatar of the first user being observed by a second avatar of the second user in a virtual environment. An initial set of M landmarks of a feature of the first avatar is determined and N landmarks are randomly selected from M for masking. The N landmarks are replaced with random noise sampled with a unit normal distribution to define a set of noised landmarks X that are then iteratively denoised to define a set of denoised landmarks D. A masked version of the first avatar is presented to the second user by modifying the feature of the first avatar with the set of denoised landmarks D. Advantageously, masking avatar features in this manner maximally preserves realism and perceived intimacy without exposing personally identifying features to an unknown public.

In some embodiments, determining the degree of intimacy R includes calculating a ratio of a total number of virtual interactions between the first user and the second user and a total number of times the first avatar and the second avatar co-existed in a same virtual environment. In some embodiments, the degree of intimacy R is represented as a value within a range between 0 and 1. In some embodiments, the intimacy-based proportion of M is calculated according to the formula $N=M \cdot (1-R)$. Advantageously, determining R in this manner allows R to be organically inferred from observations (rather than, e.g., provided manually by a user).

In some embodiments, the feature of the first avatar includes a 3D face of the first avatar and the initial set of M landmarks of the feature includes coordinate points on a mesh of the 3D face of the first avatar. Advantageously, setting the feature to a 3D face of a user's respective avatar allows for intimacy-based masking of the most recognizable feature (i.e., the face) of the user.

In some embodiments, iteratively denoising the set of noised landmarks X includes feeding the set of noised landmarks X and a diffusion time step t to a noise estimator trained to predict an amount of noise for each noised landmark x in the set of noised landmarks X, predicting the amount of noise for each noised landmark x, removing, for each noised landmark x, the predicted amount of noise, and decrementing the diffusion time step t and re-feeding the noise estimator. In some embodiments, the noise estimator is trained on a training dataset that includes a collection of training data, where each training data includes M 3D face landmarks. Advantageously, training the noise estimator in this manner improves denoising, increasing the realism of the masked version of the respective avatar.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a flowchart in accordance with one or more embodiments of the present invention.

Figure 1:
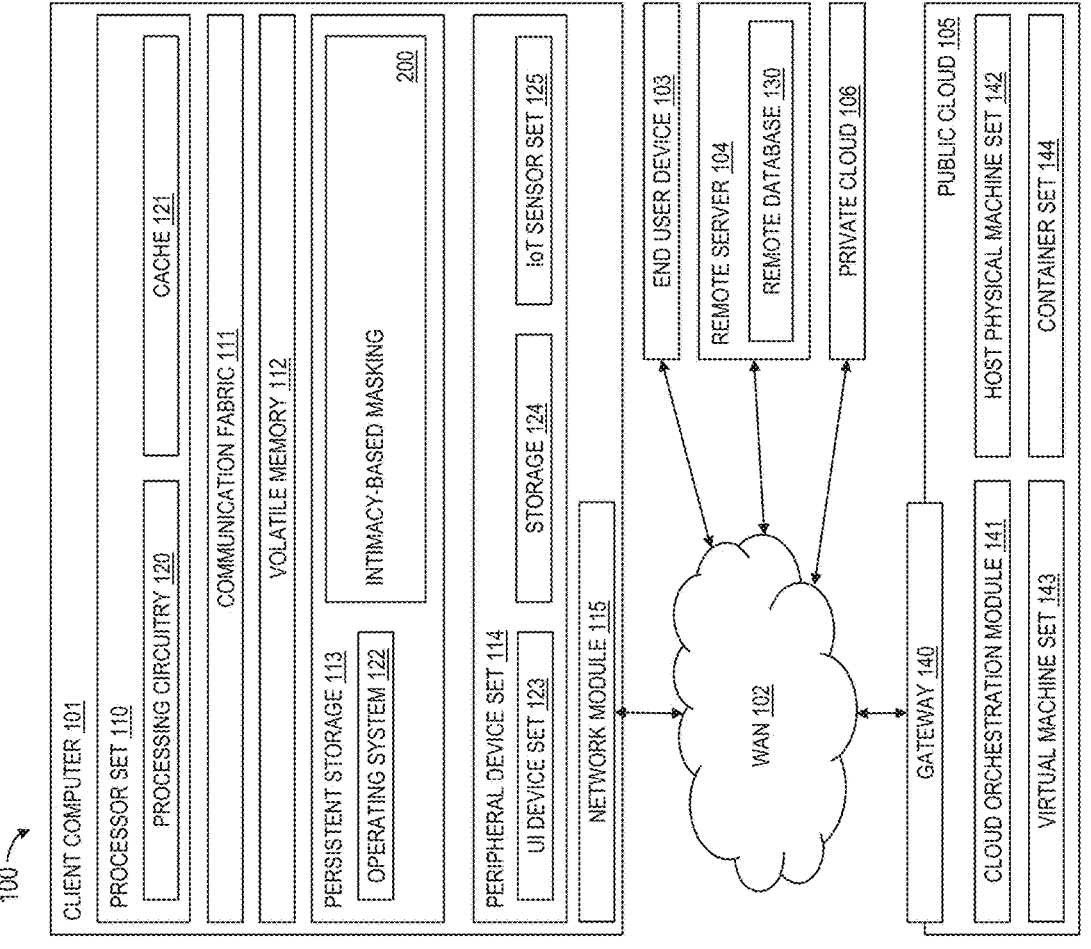
FIG. 1 depicts a block diagram of an example computing environment for use in conjunction with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

As discussed above, a metaverse is a virtual, simulated world or environment within which users can inhabit, traverse, and interact, socially and economically, via avatars. In some cases, real-world interactions, such as a meeting, can be held wholly or partially within a metaverse. Shifting some portion of real-world interactions and events to a metaverse offers a number of benefits, such as greatly increasing access and flexibility beyond that achievable for real-world interactions or events. For example, a business meeting that is typically held in person can be held instead within a metaverse, allowing employees to participate from almost anywhere in the world. Moreover, those employees can interact, via their avatars, in a safe manner regardless of the medical status (e.g., illness, etc.) of each avatar's user.

There are many challenges, however, in streamlining the metaverse experience. The value of face-to-face interactions will likely never go away, and finding new ways in which a metaverse can better mimic or otherwise replicate the quality of in-person interactions is of great interest. One approach to improve interactions within a metaverse is to make those interactions as real-like as possible. In particular, current metaverse applications allow users to personalize their avatar across an increasingly varied feature space. In some cases, users can achieve almost photo-realism with their avatars, allowing seamless, natural interactions (e.g., conversations) between users. For example, a user can present their own realistic three dimensional (3D) face model as the head of their virtual avatars, so as to be easily recognized by friends and family in various virtual interactions, and to feel the realism and intimacy of a physical conversation during those virtual interactions.

There are many technologies and tools that provide a fast and easy creation of realistic 3D face models for use within a metaverse, which makes it easier for more people to obtain virtual avatars having realistic 3D faces, and thus more and more realistic 3D faces will emerge in the metaverse. However, a realistic 3D face model by its very nature includes identifiable information for the respective individual (e.g., a realistic depiction of their facial features), which, if directly exposed to a public platform such as a metaverse without any protection mechanisms, brings certain potential risks (e.g., identity theft).

One or more embodiments of the present invention address one or more of the above-described shortcomings by providing computer-implemented methods, computing systems, and computer program products for providing an intimacy-based masking of 3D face landmarks within a metaverse. Embodiments of the present invention dynamically mask one or more features (e.g., a realistic 3D face model) of a user's avatar presented in the field of view of another avatar (e.g., within range of another user's AR/VR glasses) to varying degrees according to the degree of the intimacy between those two users. In this manner, personally identifiable information can be protected from the unknown public without sacrificing the intimacy and realism of in-person interactions with friends and family.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as intimacy-based masking 200 (referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
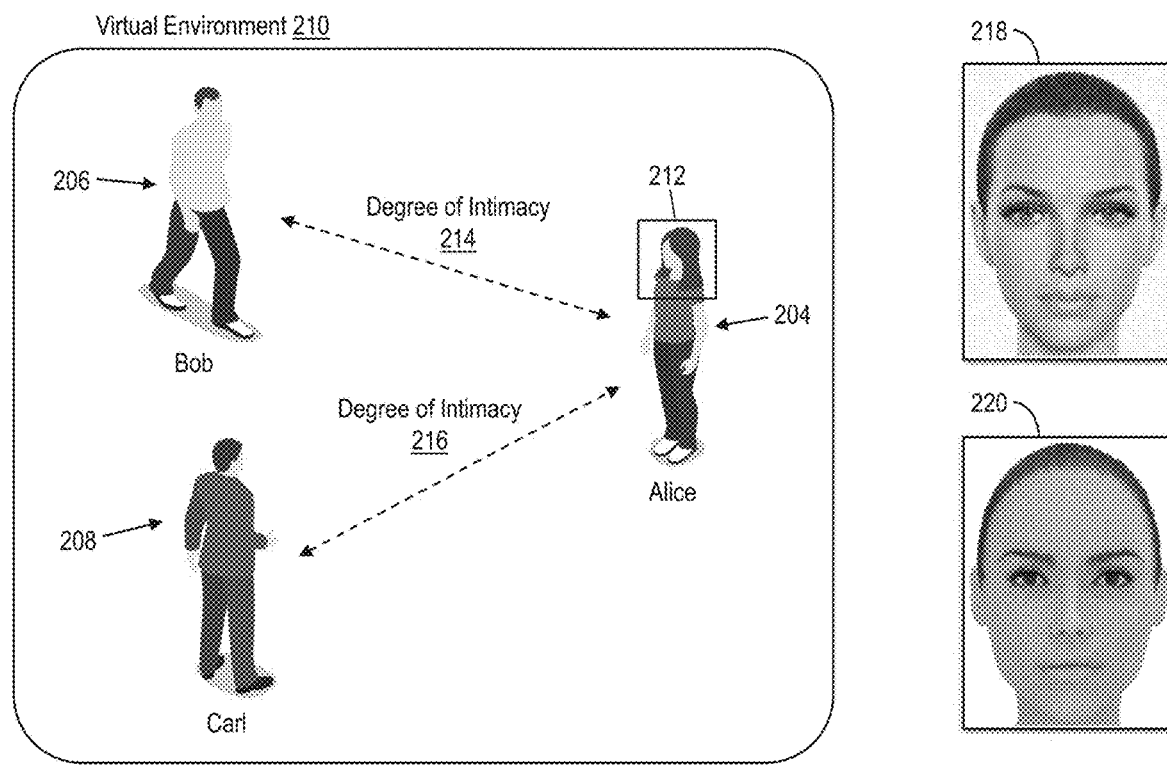
FIG. 2 depicts an example representation of a dynamic intimacy-based masking system for use in conjunction with one or more embodiments of the present invention.

Referring now to FIG. 2, an example representation of a dynamic intimacy-based masking system 202 for use in conjunction with one or more embodiments of the present invention is shown. In some embodiments, the dynamic intimacy-based masking system 202 can be implemented by (in whole or in part) one or more processors (e.g., the computing environment 100 of FIG. 1). Any number of elements of the computing environment 100 of FIG. 1 may be used in and/or integrated with the dynamic intimacy-based masking system 202. As shown in FIG. 2, a first avatar 204 (here, "Alice"), a second avatar 206 (here, "Bob"), and a third avatar 208 (here, "Carl") are currently positioned within a virtual environment 210 (e.g., a metaverse) of the dynamic intimacy-based masking system 202.

In some embodiments, a feature 212 (as shown, 3D face landmarks of the first avatar 204) is dynamically masked (altered) when presented to the second avatar 206 and the third avatar 208 according to their respective intimacy towards the first avatar 204. While shown in the context of 3D face landmark masking for ease of discussion and illustration, it should be understood that any combination of features, including and excluding facial features, can be dynamically masked in accordance with one or more embodiments and all such configurations are within the contemplated scope of this disclosure.

As discussed previously, the degree (if any) to which feature 212 is dynamically masked when shown to a user/avatar is determined from their respective intimacy towards the first avatar 204. In other words, when users B and C position their avatars (e.g., the second avatar 206 and the third avatar 208, respectively) to look at the respective avatar of a user A (here, the first avatar 204), the dynamic intimacy-based masking system 202 determines a degree of intimacy between the respective users (and/or avatars) and, based on the respective degree of intimacy, a degree to which feature 212 is masked. Continuing with the previous example, a first degree of intimacy 214 is determined between users A and B and a second degree of intimacy 216 is determined between users A and C.

In some embodiments, a degree of intimacy between the respective users is determined according to the positions of their respective avatars in the virtual environment 210 and their respective viewing angles (i.e., whether the avatars are visible to each other). The degree of intimacy between a user's avatar and another avatar in the metaverse can be defined by the respective user (e.g., user-user relationships can be provided in an account or profile associated with the user) or can be inferred automatically. For inferring a degree of intimacy, one embodiment uses the equation:

$$\text{Intimacy} = C_{ij} / N_{ij} \tag{1}$$

where $C_{ij}$ indicates the total number of virtual interactions between users i and j so far, and $N_{ij}$ indicates the total number of times users i and j co-existed in the same virtual environment. In other words, intimacy can be inferred by determining how often the user's interact, given the opportunity. However, other embodiments can apply different methods to calculate the degree of intimacy so long as: (a) the range of all calculated values can be expressed as [0.0, 1.0]; and (b) the larger the value, the more frequent the interactions between two users occur (that is, a higher degree of intimacy is demonstrated), and vice versa, and all such methods are within the contemplated scope of this disclosure. For example, the dynamic intimacy-based masking system 202 can be configured to mine (or scrape) data about each user to infer intimacy (akin to sentiment analysis). In some embodiments, the dynamic intimacy-based masking system 202 is configured to scan, with the user's permission, the user's email, social media, calendar, chat messages, etc., using natural language processing, to determine intimacy towards another user. For example, consider a scenario where a user sends an email message to a close friend that states, "See you at the conference! Let's try to find each other straight away!" In some embodiments, the dynamic intimacy-based masking system 202 can determine, from the contents of the email, that the user has a close relationship with the other user.

In some embodiments, at each time point, the dynamic intimacy-based masking system 202 (constructing the virtual environment 210) obtains a set of 3D face landmarks of user A's realistic 3D face model (i.e., the unaltered, most accurate depiction of user A's face) responsive to another user's avatar viewing (looking at) user A's avatar. For example, a landmark set 1 can be obtained for user B when the second avatar 206 looks towards the first avatar 204. Similarly, a landmark set 2 can be obtained for user C when the third avatar 208 looks towards the first avatar 204. Landmark set 1 and landmark set 2 can be the same sets (i.e., statically defined) or different sets (i.e., dynamically defined), as desired. Each landmark set (e.g., the landmark set 1 and the landmark set 2) can be constructed using known technologies, such as, for example, 3D face meshing, where each landmark set includes a total of M mesh points (face landmarks) on the avatar face.

Suppose the calculated first degree of intimacy 214 between users A and B is $R_1$ (e.g. 0.2). In some embodiments, N of the total M mesh points are randomly selected to be masked, where N is an intimacy-based proportion of M according to the formula:

$$N = M \cdot (1 - R_1) \tag{2}$$

In some embodiments, N is calculated according to formula (2) for a first range of intimacy degrees, but is calculated using one or more other methods for one or more other ranges (or single values) of intimacy degree. For example, N can be forced to zero above a predetermined threshold degree of intimacy. In some embodiments, N is forced to zero at, for example, R=0.9. In this manner, sufficiently intimate users can see the unaltered features of the respective avatar without strictly requiring 100 percent joint interactions in the metaverse.

As will be discussed in further detail with respect to FIGS. 3 and 4, guided by those unselected face landmarks in the landmark set 1, new mesh points (e.g., 3D face landmarks) are generated and used to replace (mask) each respective mesh point of the N mesh points. In some embodiments, all N randomly selected face landmarks are replaced by corresponding generated ones by changing the vertex positions (i.e., XYZ relative coordinates) of each respective point on the face mesh for 3D rendering.

The resultant masked feature set 218 represents a masked version of user A's realistic 3D face model that can be stored by the dynamic intimacy-based masking system 202 for current and later use. In some embodiments, the dynamic intimacy-based masking system 202 can replace the feature 212 with the masked feature set 218 when the user B views the first avatar 204 of user A. For example, the feature 212 can be replaced with the masked feature set 218 for 3D rendering of the first avatar 204 when the first avatar 204 is presented in the field of view of the second avatar 206 according to user B's positioning and/or orientation of AR/VR glasses and the location of the respective avatars within the virtual environment 210.

A masked feature set 220 can be similarly constructed from the landmark set 2 according to the second degree of intimacy 216 between users A and C. Notably, the intimacy-based proportion N need not be the same for users B and C. Suppose, for example, that the second degree of the intimacy 216 between users A and C is $R_2$ (e.g. 1.0). In this scenario, N will be zero and the masked feature set 220 will be equivalent to the feature 212 (i.e., the depiction of the first avatar 204 to user C will be unaltered). Suppose, alternatively, that the second degree of the intimacy 216 between users A and C is $R_2$ (e.g. 0.7). In this scenario, N will be 30 percent of M and the masked feature set 220 presented to user C will be observable different from the masked feature set 218 presented to user B (as shown).

Observe further that, even when the intimacy-based proportion N is the same for users B and C (e.g., both have a same degree of intimacy towards user A, say 0.4), the "N" points need not be the same due to the random selection of the N random points in each construction. In this manner, a different realistic 3D face model of user A's first avatar 204 can be presented in the field of view of user B and user C according to their respective familiarity with user A.

In some embodiments, the selection of N random points is re-calculated at each meeting between the respective users. Continuing with the previous example, consider a scenario in which user B leaves (logs out, ventures outside the visible range of the first avatar 204, etc.) and returns. In some embodiments, when user B returns within range of the first avatar 204, a new set of N points is selected and a new masked feature set is generated. In some embodiments, the selection of N random points is sticky, and remains unchanged for a predetermined amount of time (thus, preventing rapid re-calculations when vision is only temporarily blocked).

Figure 3:
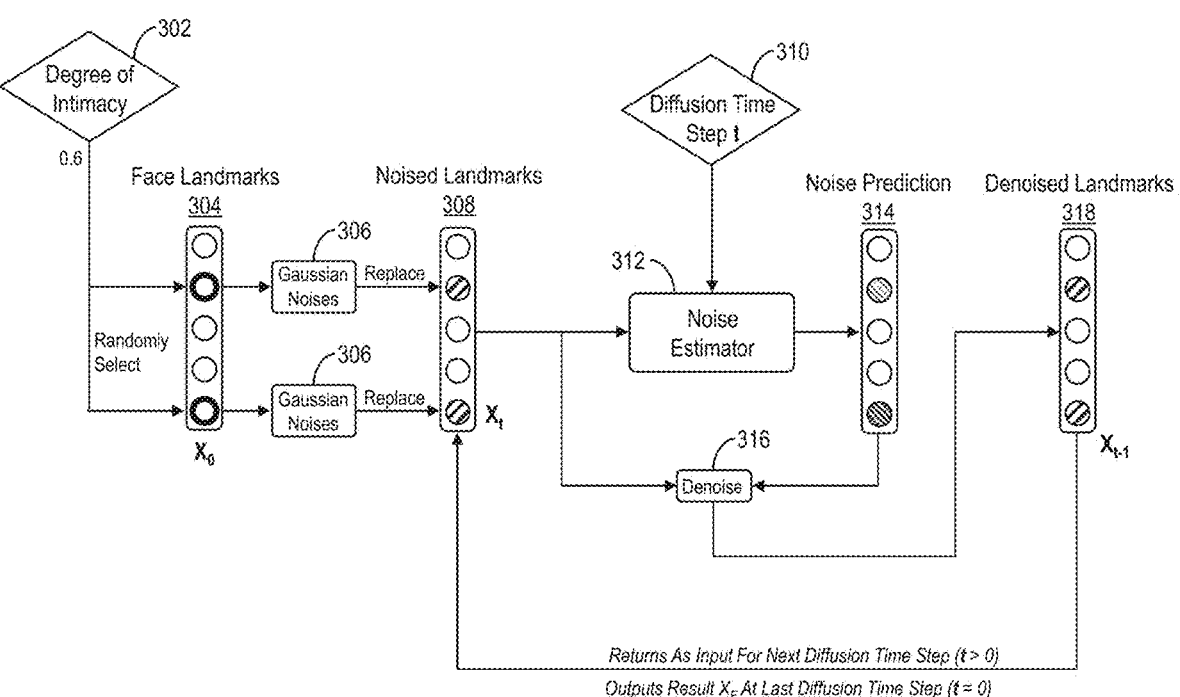
FIG. 3 depicts a block diagram for dynamic intimacy-based masking in accordance with one or more embodiments of the present invention.

FIG. 3 depicts a block diagram 300 for dynamic intimacy-based masking in accordance with one or more embodiments of the present invention. As shown in FIG. 3, a degree of intimacy 302 for a respective avatar pair (or user pair) is generated or otherwise received according to one or more embodiments. For example, the degree of intimacy 302 can be equal to 0.6 (as shown).

STEP 1: In some embodiments, M face landmarks 304 (represented as the circles in FIG. 3, where M is set to 5 for ease of illustration) are sorted (by, e.g., the dynamic intimacy-based masking system 202 in FIG. 2) in ascending order according to a landmark index, so as to form a sequence of face landmarks "$X_0$" (also referred to as an "original face-landmark sequence").

STEP 2: Suppose R is the degree of the intimacy 302 between the two users involved (e.g. R=0.6). In some embodiments, N face landmarks with a proportion of (1–R) in the original face-landmark sequence $X_0$ are randomly selected to be masked (represented as the emphasized circles of the face landmarks 304 in FIG. 3), and the landmark indices of those respective landmarks is recorded.

STEP 3: The coordinate values (XYZ) of each randomly selected face landmark in the original face-landmark sequence $X_0$ are completely replaced by random gaussian noises 306 sampled with a unit normal distribution (represented as the emphasized circles of the noised landmarks 308 in FIG. 3) in order to form an initial noised face-landmark sequence "$X_t$".

STEP 4: Feed the noised landmarks 308 and a diffusion time step 310 (denoted as t in FIG. 3, where t initializes to T, the maximum diffusion time step) to a noise estimator 312. In some embodiments, the noise estimator 312 is trained to predict an amount of Gaussian noise for each input (data point) of the noised landmarks 308, corresponding to the input diffusion time step t. The noised landmarks 308 updates at each time step, as discussed in further detail herein. Training the noise estimator 312 is discussed in greater detail with respect to FIG. 4.

As shown in FIG. 3, the prediction (referred to as a noise prediction 314) differs for each input (data point) of the noised landmarks 308. For example, the first, third, and fourth data points illustrated in FIG. 3 are predicted to have no (or negligible, within any desired threshold) Gaussian noise. Conversely, the second data point is predicted to have some Gaussian noise (denoted by a relatively lighter shading), while the fifth data point is predicted to have relatively more Gaussian noise (denoted by a relatively darker shading). The degree of predicted Gaussian noise can be bounded between 0 and 1 (where 0 is no predicted noise and 1 is a maximum predicted degree of noise), although other configurations are possible and within the contemplated scope of this disclosure.

In some embodiments, each input landmark (e.g., the noised landmarks 308) is denoised (by, e.g., a module or component of the dynamic intimacy-based masking system 202 in FIG. 2, depicted as Denoise 316 in FIG. 3) by removing its predicted Gaussian noise (from the noise prediction 314) to obtain a denoised face-landmark sequence (that is, $X_{t-1}$), referred to as denoised landmarks 318.

In some embodiments, for those unselected face landmarks in the original face-landmark sequence $X_0$, the corresponding landmarks in the denoised landmarks 318 are updated with the respective original coordinate values, so as to form a new noised face-landmark sequence as the input at a next diffusion time step (e.g., t=t−1). In other words, the noised landmarks 308 can be updated at each diffusion time step.

STEP 5: In some embodiments, STEP 4 is repeated with a decremented diffusion time step $t_i$ from T–1 to 1 (that is, until t=0 after denoising). Once the diffusion time step t equal 1, the resultant denoised landmarks 318 will define a final set (denoted "$X_F$" in FIG. 3) of new, denoised landmarks.

STEP 6: In some embodiments, the final set of landmarks $X_F$ are used to replace (mask) the N randomly selected landmarks of the M landmarks in the original face-landmark sequence $X_0$.

Figure 4:
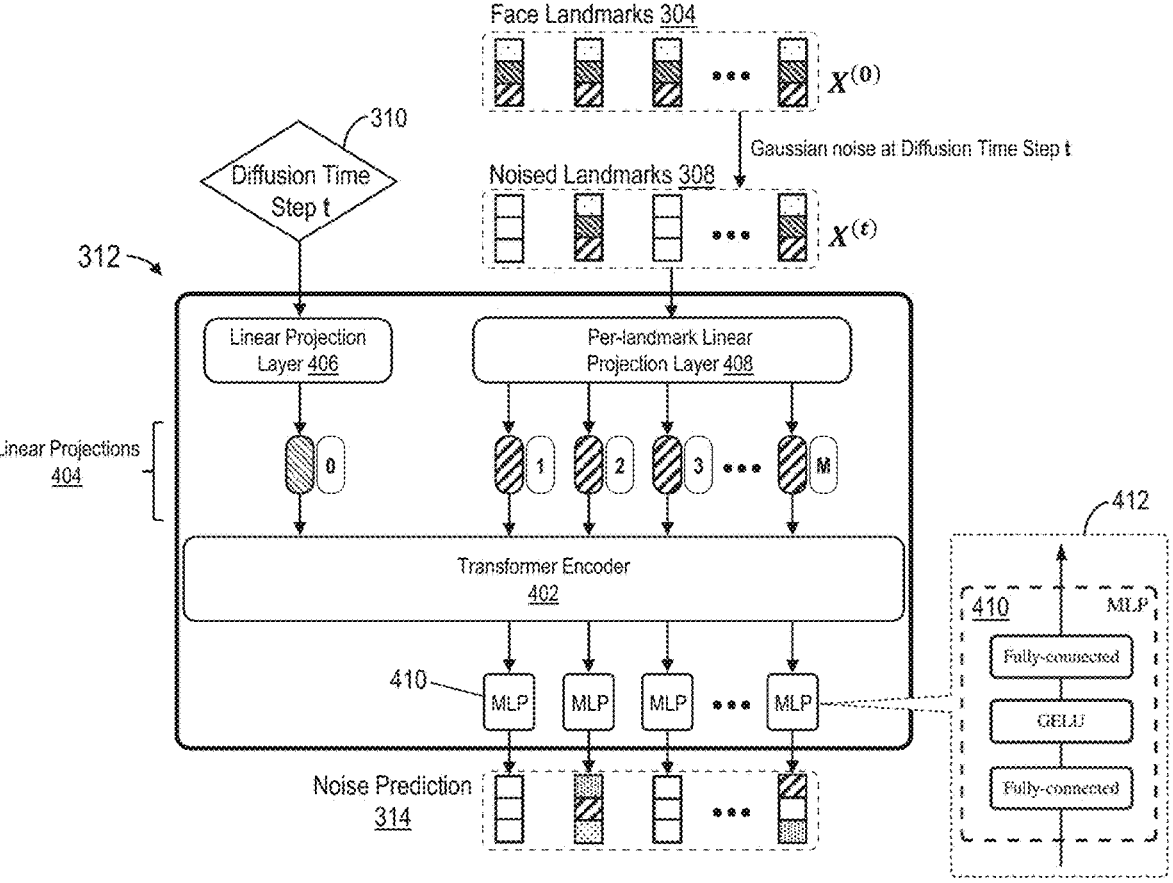
FIG. 4 depicts an example implementation of a noise estimator in accordance with one or more embodiments of the present invention.

FIG. 4 depicts an example implementation (training) of the noise estimator 312 in accordance with one or more embodiments of the present invention. As shown in FIG. 4, the noise estimator 312 can be configured as a deep learning model to predict the respective amounts of Gaussian noise existing in an input (e.g., input 3D face landmarks, such as the noised landmarks 308 of FIG. 3). As discussed previously, the noise estimator 312 can receive a diffusion time step 310 (denoted as t in FIG. 4) and noised landmarks 308. In some embodiments, the noised landmarks 308 include 2D or 3D face landmarks having a random proportion between the range [0, 1] modified with Gaussian noises corresponding to the input diffusion time step t.

In some embodiments, the noise estimator 312 includes a transformer encoder 402 as the backbone of the deep learning network. In some embodiments, the transformer encoder 402 includes L attention layers, 8 attention heads, 512 model dimensions, and 512 hidden dimensions, although other transformer encoder configurations are possible and within the contemplated scope of this disclosure.

In some embodiments, the transformer encoder 402 takes as input a sequence of linear projections 404 having size (M+1), where the first element (denoted "0" in FIG. 4) indicates a diffusion time step t represented as a one-hot encoded embedding of size 1×T (where T is, again, the maximum diffusion time step), and the other elements (denoted "1" to "M" in FIG. 4) are respectively M landmarks (e.g., 3D face landmarks) obtained at the respective diffusion time step t. In some embodiments, the M landmarks are sorted in ascending order according to a landmark index.

In some embodiments, the input diffusion time step t is linearly projected to an n-dimensional (continuing with the current scenario, n equals 512 model dimensions) token embedding through a linear projection layer 406. In some embodiments, each input landmark is considered as a three-dimensional vector that is also linearly projected to an n-dimensional (again, 512 model dimensions in the working example) token embedding through the per-landmark linear projection layer 408. Accordingly, in some embodiments, each final input embedding is the sum of a 512-dimensional token embedding and a corresponding 512-dimensional position embedding.

In some embodiments, every output 512-dimensional vector from the transformer encoder 402 that corresponds to an input landmark is converted to a three-dimensional vector through a Multilayer Perceptron (MLP) 410. The internal structure 412 for the MLP 410 can include, for example, a Gaussian error linear unit (GELU) activation function nested between two fully-connected layers.

In some embodiments, the three values of each respective converted three-dimensional vector indicates a predicted amount of noise existing at the respective coordinate value of the three-dimensional vector. For example, the predicted amounts of noise can correspond to the 3D coordinates (XYZ coordinates) of the corresponding input landmark (i.e., the first value can correspond to the X coordinate, the second value can correspond to the Y coordinate, and the third value can correspond to the Z coordinate). In some embodiments, for any unnoised input landmark, its predicted amounts of noises are all equal to zero.

Training the noise estimator 312.

In some embodiments, a training dataset is built by collecting a large number of available online or offline videos depicting one or more characters, and then obtaining, from the videos, the 3D face landmarks of every single character at any time point in those videos using known techniques (i.e., 3D facial recognition techniques, including, for example, 3D face meshing and 3D landmark recognition). In some embodiments, every M 3D face landmarks obtained in this manner per time point is grouped and considered as one training data. In some embodiments, all such training data are stored within a training dataset.

TRAINING STEP 1: In some embodiments, at every time step randomly select a training data (that is, a face-landmark set of size M) from the training dataset.

TRAINING STEP 2: Randomly select an integer number t within the range [1, T] as the current diffusion time step.

TRAINING STEP 3: Randomly select a ratio within the range [0.0, 1.0] as the assumed degree of intimacy R.

TRAINING STEP 4: Randomly select 3D face landmarks with a proportion of (1−R) in the original face-landmark set (obtained at TRAINING STEP 1).

TRAINING STEP 5: The coordinate values (e.g., XYZ values) of each selected 3D face landmark (from TRAINING STEP 4) are modified with Gaussian noises, respectively. The Gaussian noises are calculated using the formula:

$$q(x_t|x_0) = \mathcal{N}_{(x_t; \sqrt{\overline{\alpha_t}} x_0, (1-\overline{\alpha_t})I)} \quad (3)$$

where $\alpha_t := 1-\beta_t$, $\overline{\alpha_t} := \Pi_{s=1}{}^t \alpha_s$, $\beta_t$ is a linear schedule (e.g., from $\beta_1 = 10^{-4}$ to $\beta_T = 0.02$), $x_0$ indicates an original coordinate value, and $x_t$ indicates a noised coordinate value with the added Gaussian noise corresponding to the current diffusion time step t. For example, consider a straight line in the x-y plane and T set to 1000. Now, there are a total of 1000 discrete 2D points on the line, and their respective 2D coordinate values are $(1, \beta_1)$, $(2, \beta_2)$, $(3, \beta_3)$, $(T, \beta_T)$. In some embodiments, the values of $\beta_1$ and $\beta_T$ are pre-determined according to experience (e.g., by expert or empirical data). Continuing with this example, $\beta_1$ and $\beta_T$ are set to the values $10^{-4}$ and 0.02, respectively, although other values are possible and within the contemplated scope of this disclosure. The values of the other $\beta_t$ elements are determined according to the related x coordinate value (that is, the value of t; as t denotes the diffusion time step).

TRAINING STEP 6: Construct an input sequence which includes the linearly projected diffusion time step t (obtained at TRAINING STEP 2), M linearly projected 3D face landmarks (obtained at TRAINING STEP 1 and processed at TRAINING STEP 5), and their respective position embeddings.

TRAINING STEP 7: Feed the sequence (constructed at TRAINING STEP 6) to the transformer encoder 402. The amounts of noise corresponding to each input 3D face landmark can be predicted and obtained at the output side of the MLP.

TRAINING STEP 8: Use $l^2$-norm to calculate the loss between the predicted and actual Gaussian noises, and then use backpropagation to update the parameters of the noise estimator 312 (e.g., the parameters of the MLP 410).

Referring now to FIG. 5, a flowchart 500 for a dynamic intimacy-based masking of avatar features in a metaverse is generally shown according to an embodiment. The flowchart 500 is described in reference to FIGS. 1-4 and may include additional blocks not depicted in FIG. 5. Although depicted in a particular order, the blocks depicted in FIG. 5 can be rearranged, subdivided, and/or combined.

At block 502, a degree of intimacy R between a first user and a second user is determined responsive to a first avatar of the first user being observed by a second avatar of the second user in a virtual environment. In some embodiments, determining the degree of intimacy R includes calculating a ratio of a total number of virtual interactions between the first user and the second user and a total number of times the first avatar and the second avatar co-existed in a same virtual environment. In some embodiments, the degree of intimacy R is represented as a value within a range between 0 and 1.

At block 504, an initial set of M landmarks of a feature of the first avatar is determined. In some embodiments, the feature of the first avatar is a 3D face of the first avatar and the initial set of M landmarks of the feature are coordinate points on a mesh of the 3D face of the first avatar.

At block 506, N landmarks are randomly selected from the initial set of M landmarks for masking. In some embodiments, N includes an intimacy-based proportion of M. In some embodiments, the intimacy-based proportion of M is calculated according to the formula $N=M \cdot (1-R)$.

At block 508, a value of each selected landmark n of the N landmarks is replaced with a respective random noise sampled with a unit normal distribution to define a set of noised landmarks X.

At block 510, the set of noised landmarks X is iteratively denoised to define a set of denoised landmarks D. In some embodiments, iteratively denoising the set of noised landmarks X includes feeding the set of noised landmarks X and a diffusion time step t to a noise estimator trained to predict an amount of noise for each noised landmark x in the set of noised landmarks X. In some embodiments, iteratively denoising the set of noised landmarks X further includes predicting the amount of noise for each noised landmark x, removing, for each noised landmark x, the predicted amount of noise, and decrementing the diffusion time step t and re-feeding the noise estimator.

At block 512, a masked version of the first avatar is presented to the second user by modifying the feature of the first avatar with the set of denoised landmarks D.

In some embodiments, the method further includes training the noise estimator on a training dataset comprising a collection of training data, wherein each training data comprises M 3D face landmarks.

Technical advantages and benefits include automated, dynamic, intimacy-based masking of personalized features (e.g., 3D face landmarks) of a user's avatar within a metaverse. Randomly masking and denoising avatar features according to one or more embodiments allows for the use of more natural, realistic avatars and a more engaging virtual experience without sacrificing personally identifiable information. Random masking alone can result in unrealistic feature sets, while static (nonrandom) masking, even with denoising, is not flexible with respect to evolving intimacy levels between users. Other technical advantages are possible. For example, conventional Denoising Diffusion Probabilistic Models (DDPMs) used in image generation operate over the whole dataset, while the present system generates and denoises a randomly selected subset N of M data points (e.g., 3D face landmarks) conditioned on the unselected data points (e.g., the M-N unselected face landmarks). Conditioning denoising of a random subset on the remaining, unaltered data points further improves the realism of the resultant, anonymized feature set by constraining the random drift of each respective point in a manner that respects the original configuration.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
determining a degree of intimacy R between a first user and a second user responsive to a first avatar of the first user being observed by a second avatar of the second user in a virtual environment;
determining an initial set of M landmarks of a feature of the first avatar;
randomly selecting N landmarks from the initial set of M landmarks for masking, wherein N comprises an intimacy-based proportion of M;
replacing a value of each selected landmark n of the N landmarks with a respective random noise sampled with a unit normal distribution to define a set of noised landmarks X;
iteratively denoising the set of noised landmarks X to define a set of denoised landmarks D; and
presenting, to the second user, a masked version of the first avatar by modifying the feature of the first avatar with the set of denoised landmarks D.

2. The computer-implemented method of claim 1, wherein determining the degree of intimacy R comprises calculating a ratio of a total number of virtual interactions between the first user and the second user and a total number of times the first avatar and the second avatar co-existed in a same virtual environment.

3. The computer-implemented method of claim 1, wherein the degree of intimacy R is represented as a value within a range between 0 and 1.

4. The computer-implemented method of claim 1, wherein the feature of the first avatar comprises a three dimensional (3D) face of the first avatar and the initial set of M landmarks of the feature comprises coordinate points on a mesh of the 3D face of the first avatar.

5. The computer-implemented method of claim 1, wherein the intimacy-based proportion of M is calculated according to the formula $N = M \cdot (1-R)$.

6. The computer-implemented method of claim 1, wherein iteratively denoising the set of noised landmarks X comprises:

feeding the set of noised landmarks X and a diffusion time step t to a noise estimator trained to predict an amount of noise for each noised landmark x in the set of noised landmarks X;

predicting the amount of noise for each noised landmark x;

removing, for each noised landmark x, the predicted amount of noise; and decrementing the diffusion time step t and re-feeding the noise estimator.

7. The computer-implemented method of claim 6, further comprising training the noise estimator on a training dataset comprising a collection of training data, wherein each training data comprises M three dimensional (3D) face landmarks.

8. A system having a memory, computer readable instructions, and one or more processors for executing the computer readable instructions, the computer readable instructions controlling the one or more processors to perform operations comprising:

determining a degree of intimacy R between a first user and a second user responsive to a first avatar of the first user being observed by a second avatar of the second user in a virtual environment;

determining an initial set of M landmarks of a feature of the first avatar;

randomly selecting N landmarks from the initial set of M landmarks for masking, wherein N comprises an intimacy-based proportion of M;

replacing a value of each selected landmark n of the N landmarks with a respective random noise sampled with a unit normal distribution to define a set of noised landmarks X;

iteratively denoising the set of noised landmarks X to define a set of denoised landmarks D; and presenting, to the second user, a masked version of the first avatar by modifying the feature of the first avatar with the set of denoised landmarks D.

9. The system of claim 8, wherein determining the degree of intimacy R comprises calculating a ratio of a total number of virtual interactions between the first user and the second user and a total number of times the first avatar and the second avatar co-existed in a same virtual environment.

10. The system of claim 8, wherein the degree of intimacy R is represented as a value within a range between 0 and 1.

11. The system of claim 8, wherein the feature of the first avatar comprises a three dimensional (3D) face of the first avatar and the initial set of M landmarks of the feature comprises coordinate points on a mesh of the 3D face of the first avatar.

12. The system of claim 8, wherein the intimacy-based proportion of M is calculated according to the formula $N=M\cdot(1-R)$.

13. The system of claim 8, wherein iteratively denoising the set of noised landmarks X comprises:

feeding the set of noised landmarks X and a diffusion time step t to a noise estimator trained to predict an amount of noise for each noised landmark x in the set of noised landmarks X;

predicting the amount of noise for each noised landmark x;

removing, for each noised landmark x, the predicted amount of noise; and decrementing the diffusion time step t and re-feeding the noise estimator.

14. The system of claim 13, further comprising training the noise estimator on a training dataset comprising a collection of training data, wherein each training data comprises M three dimensional (3D) face landmarks.

15. A computer program product comprising a computer readable storage medium having program instructions embodied therewith, the program instructions executable by one or more processors to cause the one or more processors to perform operations comprising:

determining a degree of intimacy R between a first user and a second user responsive to a first avatar of the first user being observed by a second avatar of the second user in a virtual environment;

determining an initial set of M landmarks of a feature of the first avatar;

randomly selecting N landmarks from the initial set of M landmarks for masking, wherein N comprises an intimacy-based proportion of M;

replacing a value of each selected landmark n of the N landmarks with a respective random noise sampled with a unit normal distribution to define a set of noised landmarks X;

iteratively denoising the set of noised landmarks X to define a set of denoised landmarks D; and presenting, to the second user, a masked version of the first avatar by modifying the feature of the first avatar with the set of denoised landmarks D.

16. The computer program product of claim 15, wherein determining the degree of intimacy R comprises calculating a ratio of a total number of virtual interactions between the first user and the second user and a total number of times the first avatar and the second avatar co-existed in a same virtual environment.

17. The computer program product of claim 15, wherein the degree of intimacy R is represented as a value within a range between 0 and 1.

18. The computer program product of claim 15, wherein the feature of the first avatar comprises a three dimensional (3D) face of the first avatar and the initial set of M landmarks of the feature comprises coordinate points on a mesh of the 3D face of the first avatar.

19. The computer program product of claim 15, wherein the intimacy-based proportion of M is calculated according to the formula $N=M\cdot(1-R)$.

20. The computer program product of claim 15, wherein iteratively denoising the set of noised landmarks X comprises:

feeding the set of noised landmarks X and a diffusion time step t to a noise estimator trained to predict an amount of noise for each noised landmark x in the set of noised landmarks X;

predicting the amount of noise for each noised landmark x;

removing, for each noised landmark x, the predicted amount of noise; and decrementing the diffusion time step t and re-feeding the noise estimator.

* * * * *